United States Patent [19]

Slaugh et al.

[11] Patent Number: 4,665,047

[45] Date of Patent: May 12, 1987

[54] STABILIZATION OF METALLOCENE/ALUMINOXANE CATALYSTS

[75] Inventors: Lynn H. Slaugh, Cypress; Galeon W. Schoenthal, Houston, both of Tex.

[73] Assignee: Shell Oil Company, Houston, Tex.

[21] Appl. No.: 896,697

[22] Filed: Aug. 15, 1986

[51] Int. Cl.[4] .................................................. C08F 4/64
[52] U.S. Cl. .................................... 502/108; 502/117; 526/89
[58] Field of Search ................................ 502/108, 117

[56] References Cited

U.S. PATENT DOCUMENTS 3,404,096 10/1968 Lamborn .............................. 502/108
4,404,344 9/1983 Sinn et al. ........................ 502/117 X
4,542,199 9/1985 Kaminsky et al. .............. 502/117 X

FOREIGN PATENT DOCUMENTS 1300734 12/1972 United Kingdom ................ 502/108

*Primary Examiner*—Patrick P. Garvin

[57] ABSTRACT

Zirconocene/aluminoxane polymerization/oligomerization catalysts are stabilized against aging prior to use as catalysts by use of at least 1 mole of 3,3,3-trialkyl-1-propene per mole of metallocene.

7 Claims, No Drawings

STABILIZATION OF METALLOCENE/ALUMINOXANE CATALYSTS

FIELD OF THE INVENTION

Zirconocene/aluminoxane polymerization/oligomerization catalysts are stabilized against aging by maintaining them in an organic solvent containing at least 1 mole of 3,3,3-trialkyl-1-propene per mole of zirconocene.

BACKGROUND OF THE INVENTION

Zirconocene/aluminoxane catalysts are known in the art for producing polymers from olefins. European Pat. No. 128,045 discloses the use of titanocenes, zirconocenes, hafnocenes and vanadocenes in combination with aluminoxane to produce polyethylene. In co-pending application Ser. No. 896,700, filed Aug. 15, 1986, is disclosed the use of certain zirconocenes and hafnocenes in combination with aluminoxane to produce dimers of alpha-olefins. In U.S. Pat. No. 4,404,344, issued Sept. 13, 1983 is disclosed the use of zirconocenes in combination with aluminoxanes to produce polymers. One problem with these zirconocene/aluminoxane catalysts is that they must be used relatively quickly after preparation or their performance as catalysts will suffer. A method has been found to stabilize these catalysts against aging during storage prior use.

SUMMARY OF THE INVENTION

This invention relates to a method for stabilizing zirconocene/aluminoxanes catalysts against aging during storage prior to use by maintaining them in an organic solvent containing at least 1 mole of 3,3,3-trialkyl-1-propene per mole of zirconocene.

DETAILED DESCRIPTION OF THE INVENTION

The zirconocene/aluminoxane catalysts to be stabilized by the method of the instant invention are prepared by reacting a suitable zirconocene with an aluminoxane.

The aluminoxanes (or alumoxanes) are well-known in the art and are polymeric aluminum compounds which can be represented by the general formula $(R-Al-O)_n$ which is a cyclic compound and $R(R-Al-O)_nAlR_2$, which is a linear compound. In the general formula, R is a $C_1-C_5$ alkyl group such as, for example, methyl, ethyl, propyl, butyl and pentyl, and n is an integer from 1 to about 20. Generally, in the preparation of aluminoxanes from trialkyl aluminum and water, a mixture of the linear and cyclic compounds are obtained.

The aluminoxanes can be prepared in various ways. They are prepared by contacting water with a solution of trialkyl aluminum in a suitable organic solvent. Illustrative examples of suitable trialkyl aluminum compounds are trimethyl aluminum, triethyl aluminum, tri-isopropyl aluminum, tri-n-propyl aluminum, tri-isobutyl aluminum, tri-n-pentyl aluminum, etc. For example, the trialkyl aluminum is treated with water in the form of a moist solvent, or ultrasonically dispersed in a solvent (as disclosed in co-pending application Ser. No. 896,689 filed Aug. 15, 1986 or dispersed in a solvent by high-speed stirring (as disclosed in co-pending application Ser. No. 896,701 filed Aug. 15, 1986 or by contact with a hydrated salt such as hydrated copper sulfate or aluminum sulfate as per U.S. Pat. No. 4,544,762, issued Oct. 1, 1985.

The inert solvents that can be used to dissolve the trialkyl aluminum or disperse or contain the water are well-known and include the saturated aliphatic compounds such as butane, pentane, hexane, heptane, octane, isoctane, the purified kerosenes, etc., the cycloaliphatics such as cyclobutane, cyclopentane, cyclohexane, cycloheptane, methylcyclopentane, dimethylcyclopentane, etc.; alkenes and cyclolkenes such as butene, hexene, cyclohexene, octene, etc.; and the aromatic solvents such as benzene, toluene, xylene, etc.; and the like. The major requirements in the selection of a solvent are that it be liquid at the reaction temperature, that it does not react with the trialkyl aluminum compound or with water or interfere with any subsequent reaction wherein the aluminoxanes are used in polymerization catalysts. The solvents must be oxygen-free. Hydroxyl groups, ether groups, carboxyl groups, keto groups and the like adversely affect preparation of the aluminoxanes. All or part of the solvent may be the stabilizing 3,3,3-trialkyl-1-propene.

The zirconocenes are organometallic coordination compounds which have the general formula (cyclopentadienyl)$_n$ZrY$_{4-n}$ wherein n is an integer from 1 to 4 and Y is individually selected from the group consisting of hydrogen, $C_1-C_5$ alkyl, $C_6-C_{20}$ aryl and halogen. Preferably n is 2 and Y is hydrogen, methyl or chlorine. It is understood that when n is 2-4 the Ys may be the same or different. Within the definition of cyclopentadienyl is included the lower alkyl($C_1-C_5$)-substituted, preferably the methyl-substituted cyclopentadienyl.

The ratio of aluminum in the aluminoxane to zirconium metal in the zirconocenes can be in the range of about 1:1 to about $10^8:1$.

In general terms, the catalyst is prepared by adding the aluminoxane dissolved in an organic solvent, preferably the solvent utilized to prepare the aluminoxane, to a well stirred suspension of the zirconocene in a dry, inert, organic solvent, which solvent can suitably be the solvent described above for the preparation of the aluminoxane. Preferably, the solvents are the same. When the stirred solution to which the aluminoxane has been added becomes homogeneous, the catalyst has been formed.

The catalysts prepared as described above are stabilized against aging prior to use by the addition to the dissolved catalyst of at least 1 mole of the stabilizing olefin per mole of zirconocene. The stabilizing olefins should be added during or shortly after preparation to prevent degradation. Typically, the stabilizing olefin is added less than an hour after preparation. Alternatively, the stabilizing olefin may be used in total or in part in the preparation of the aluminoxane or to suspend the zirconocene during catalyst preparation whereby at least 1 mole of stabilizing olefin is present per mole of zirconocene in the finished catalysts.

The stabilizing olefins have the following general formula

$$R_1R_2R_3CCH=CH$$

where $R_1$, $R_2$ and $R_3$ are alkyl groups with carbon numbers ranging from 1 to 20. Preferred stabilizing olefins are 3,3,3-trialkyl-1-propenes, particularly 3,3,3-trimethyl-1-propene.

The use of the stabilizing olefins to stabilize the metallocene/aluminoxanes are further illustrated by the following examples which are provided for illustration and are not to be construed as limiting the invention.

ILLUSTRATIVE EMBODIMENT

The following procedures were followed. In a nitrogen-filled dry box methylalumoxane was prepared by adding 8 millimoles (mmoles) of trimethylaluminum (as a 25 wt% solution in toluene) to 2 mmoles of copper sulfate pentahydrate slurried in toluene. After the reaction of the trimethylaluminum with the water in the copper sulfate was complete as evidenced by cessation of gas evolution, the solution of the resultant methylaluminoxane was transferred to a nitrogen-flushed, stirred flask containing 1 mmole of bis(cyclopentadienyl)zirconium dichloride and 2 mmoles of the solvent/olefin listed in Column 1 of Table 1. The catalysts thus formed were stored under nitrogen and at ambient temperature for several days after which time, 320 mmoles of feed olefin (1-octene) was added, and the system stirred and heated to 40° C. to effect dimerization of the 1-octene. Conversion levels of 1-octene were measured after 0.5 and 2 hours reaction times and are given in Table 1.

TABLE 1

| Solvent/olefin | Storage time before adding feed olefin | wt % Conv. of 1-octene | |
|---|---|---|---|
| | | 0.5 hr. | 2 hr. |
| toluene | 4 days | 0 | 0 |
| 1-octene | 3 days | 1 | 1 |
| 3,3-dimethyl-1-butene | 4 days | 7.3 | 68.2 |
| 3-methyl-3-ethyl-1-pentene | 4 days | 9.7 | — |
| 3,3-dimethyl-1-pentene | 6 days | 2.4 | 18.9 |

We claim:

1. A method for stabilizing a zirconocene/aluminoxane catalyst comprising (a) a zirconocene of the general formula (cyclopentadienyl)$_n$ZrY$_{4-n}$ wherein n is an integer from 1 to 4, and Y is individually selected from the group consisting of hydrogen, $C_1$-$C_5$ alkyl, $C_6$-$C_{20}$ aryl and halogen and (b) an aluminoxane against aging during storage prior to use as a catalyst which comprises adding to the catalyst during or after its preparation at least 1 mole of a stabilizing olefin of the formula $R_1R_2R_3CCH_2$=$CH_2$ (wherein $R_1$, $R_2$ and $R_3$ are $C_1$-$C_{20}$ alkyl moieties) per mole of zirconocene.

2. The method of claim 1 wherein the stabilizing olefin is 3,3,3-trialkyl-1-propene.

3. The method of claim 2 wherein the stabilizing olefin is 3,3,3-trimethyl-1-propene.

4. A stabilized zirconocene/aluminoxane catalyst composition comprising a zirconocene of the general formula (cyclopentadienyl)$_n$ZrY$_{4-n}$ wherein n is an integer from 1 to 4, and Y is individually selected from the group consisting of hydrogen, $C_1$-$C_5$ alkyl, $C_6$-$C_{20}$ aryl and halogen; an aluminoxane and at least 1 mole of a stabilizing olefin of the formula $R_1R_2R_3CCH_2$=$CH_2$ (where $R_1$, $R_2$ and $R_3$ are $C_1$-$C_{20}$ alkyl moieties) per mole of zirconocene.

5. The composition of claim 4 wherein the zirconocene is bis(cyclopentadienyl)zirconium dichloride, bis(cyclopentadienyl)zirconium hydrogen chloride or bis(cyclopentadienyl)zirconium dimethyl.

6. The composition of claims 4 or 5 wherein the stabilizing olefin is 3,3,3-trialkyl-1-propene.

7. The composition of claims 4 or 5 wherein the stabilizing olefin is 3,3,3-trimethyl-1-propene.

* * * * *